(12) United States Patent
Kim

(10) Patent No.: US 7,421,573 B2
(45) Date of Patent: Sep. 2, 2008

(54) APPARATUS AND METHOD FOR UPDATING FIRMWARE

(75) Inventor: Yang Hoon Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 384 days.

(21) Appl. No.: 11/018,374

(22) Filed: Dec. 22, 2004

(65) Prior Publication Data

US 2005/0177709 A1 Aug. 11, 2005

(30) Foreign Application Priority Data

Feb. 7, 2004 (KR) .............. 10-2004-0008139

(51) Int. Cl.
*G06F 9/24* (2006.01)
*G06F 15/177* (2006.01)

(52) U.S. Cl. .............. 713/1; 713/2; 711/100; 711/103

(58) Field of Classification Search ............. 713/1, 713/2; 711/100, 103
See application file for complete search history.

(56) References Cited

U.S. PATENT DOCUMENTS

| | | | |
|---|---|---|---|
| 5,579,522 A | 11/1996 | Christeson et al. | 395/652 |
| 6,834,384 B2 * | 12/2004 | Fiorella et al. | 717/169 |
| 6,907,602 B2 * | 6/2005 | Tsai et al. | 717/168 |
| 2004/0015941 A1 * | 1/2004 | Sekine | 717/168 |
| 2004/0030877 A1 * | 2/2004 | Frid | 713/1 |
| 2004/0040019 A1 * | 2/2004 | Ha | 717/168 |
| 2004/0076043 A1 * | 4/2004 | Boals et al. | 365/200 |

OTHER PUBLICATIONS

Chinese Office Action dated Sep. 22, 2006.

* cited by examiner

*Primary Examiner*—Nitin C. Patel
*Assistant Examiner*—Fahmida Rahman
(74) *Attorney, Agent, or Firm*—Ked & Associates, LLP

(57) ABSTRACT

The present invention relates to an apparatus and a method for updating firmware of an embedded controller (EC) constituted in portable machinery. Embodiments of the present invention can set identification information for maintaining a system power-on state before performing operations of updating the firmware of the embedded controller. In the ROM area of the embedded controller, a new firmware file is updated and recorded. Then, the new firmware file can be updated and recorded in the RAM area of the embedded controller after system re-start or while maintaining the system power and without system re-start responsive to the identification information.

17 Claims, 9 Drawing Sheets

| Tag | RAM Size | Data<br>Auxsta, kbdsta··· of Bank 3 |
|---|---|---|

Fig.7a

```
case 0xC8:
// Write Special Data From EC
        switch (cmdHisIF1.dataLevel)
        {
        case 0:
// Receive Subcommand
                if (RCVOK != hostGetDataIF1())
                {
                        return;
                }
        case 1:
// Receive Write Data
                if (RCVOK != hostGetDataIF1())
                {
                        return;
                }
        case 2:
                switch(cmdHisIF1.uDataBuffer[0])
// Parsing SubCommand
                {
                case 0x84:
// read Get action after KBC flash update
                        if (cmdHisIF1.uDataBuffer[1] == ON)
                        {
                                setFlashSignature();
                        }
                        else
                        {
                                clearFlashSignature();
                        }
                        break;
                }
        }
        break;
```

Fig.7b

```
// power on reset routine
main()
{
        SP = 0x80;
        chipRstLocVarStack();

if (getFlashSignture() == ON)
        // If there a flash signature?
        {
                utilDly100us(200);
        // just delay
                getECRam();
        // Read system main memory by the flash program, then store to the RAM
                home();
        // Go to main routine
        } pmColdInitial();
        // Set Cold Initial pmPwrOffVarDef();
        // Make Variable Power off Default
        pmPwrOffPortDef(ON);
        // Make port power off default
        utilDly100us(50);
        // reset delay
        oemChkModel();
        i2cInit();
        home();
        // Go to main routine
}
```

APPARATUS AND METHOD FOR UPDATING FIRMWARE

BACKGROUND OF THE INVENTION

1. Field of the Invention

The present invention relates to an apparatus and a method for updating firmware an embedded controller (EC) constituted in portable appliance or machinery.

2. Background of the Related Art

A general computer can include an embedded controller. When a firmware file is updated and recorded in the general embedded controller, a system is unconditionally re-booted. Accordingly, there is a disadvantage in that a long time is required for a firmware update operation. Thus, there exists a need for an improved apparatus and method for updating firmware for a computer.

SUMMARY OF THE INVENTION

An object of the invention is to solve at least the problems and/or disadvantages described herein and to provide at least the advantages described hereinafter.

Another object of the present invention is to provide a portable computer firmware update system and method that is capable of reduced execution times.

Another object of the invention is to provide an apparatus and a method for updating firmware of an embedded controller with new firmware that does not perform a system re-booting operation.

Another object of the invention is to provide an apparatus and a method for updating firmware of an embedded controller with new firmware that updates embedded controller RAM while maintaining the system in an ON state after updating an update program stored in a system main memory.

Another object of the invention is to provide an apparatus and a method for updating firmware of an embedded controller with new firmware that can reduce or prevent in advance an error as occurred during the copying and recording process in the RAM area when reading out the firmware as recorded in the ROM area.

Another object of the invention is to provide an apparatus and a method for updating firmware of an embedded controller with new firmware that can concurrently perform the firmware update operation in the embedded controller ROM and the embedded controller RAM.

Another object of the invention is to provide an apparatus and a method for updating firmware of an embedded controller with new firmware after storing a update program in ROM and verifying whether there is predetermined information to maintain a system in an ON state, updates RAM by maintaining the system in the ON state accordingly.

Another object of the invention is to provide an apparatus and a method for updating firmware of an embedded controller (EC) with new firmware that can establish predetermined information (e.g., preset by a user) to maintain a system in an ON state when a update program of a system main memory performs an interface operation with a flash routine as executed in an EC ROM area.

In order to achieve at least the above objects and advantages in a whole or in part, in accordance with one aspect of the present invention there is provided a method for updating firmware of an embedded controller of a portable computer that includes setting a firmware update mode and updating a new firmware file in an embedded controller in one of a first mode and a second mode responsive to the set firmware update mode.

To further achieve at least the above objects and advantages in a whole or in part, in accordance with one aspect of the present invention there is provided a method for updating firmware of an embedded controller that includes setting identification information for maintaining a system power-on state before updating firmware of an embedded controller, updating and recording a new firmware file in a ROM area of the embedded controller and verifying the identification information and updating and recording the new firmware file in a RAM area of the embedded controller in a state of maintaining the system power in accordance with a result of the verification.

To further achieve at least the above objects and advantages in a whole or in part, in accordance with one aspect of the present invention there is provided a apparatus for updating firmware that includes an embedded controller configured to have a firmware file to be updated, a main program memory and an auxiliary program memory, wherein the main and auxiliary program memories perform an operation of updating firmware to be recorded and stored in the embedded controller and a controller configured to generate a command to maintain a system power-on state during the operation for updating the firmware of the embedded controller in the main and auxiliary program memories.

To further achieve at least the above objects and advantages in a whole or in part, in accordance with one aspect of the present invention there is provided a computer readable medium having a computer-executable components that includes a first component for setting a firmware update mode for updating firmware of an embedded controller of a portable computer and a second component for updating a new firmware file in the embedded controller in one of a first mode and a second mode responsive to the set firmware update mode.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4a is a diagram that shows part of a computer according to a preferred embodiment of the present invention;

FIG. 4b is a diagram that shows an exemplary data format as stored in a system main memory in external storage medium of FIG. 4a;

FIG. 7a is a diagram that shows an exemplary routine for setting a tag to maintain a system in an ON-state after updating firmware; and FIG. 7b is a diagram that shows an exemplary routine for maintaining a system in an ON-state and storing a update program in a EC RAM.

DETAILED DESCRIPTION OF PREFERRED EMBODIMENTS

Figure 1:
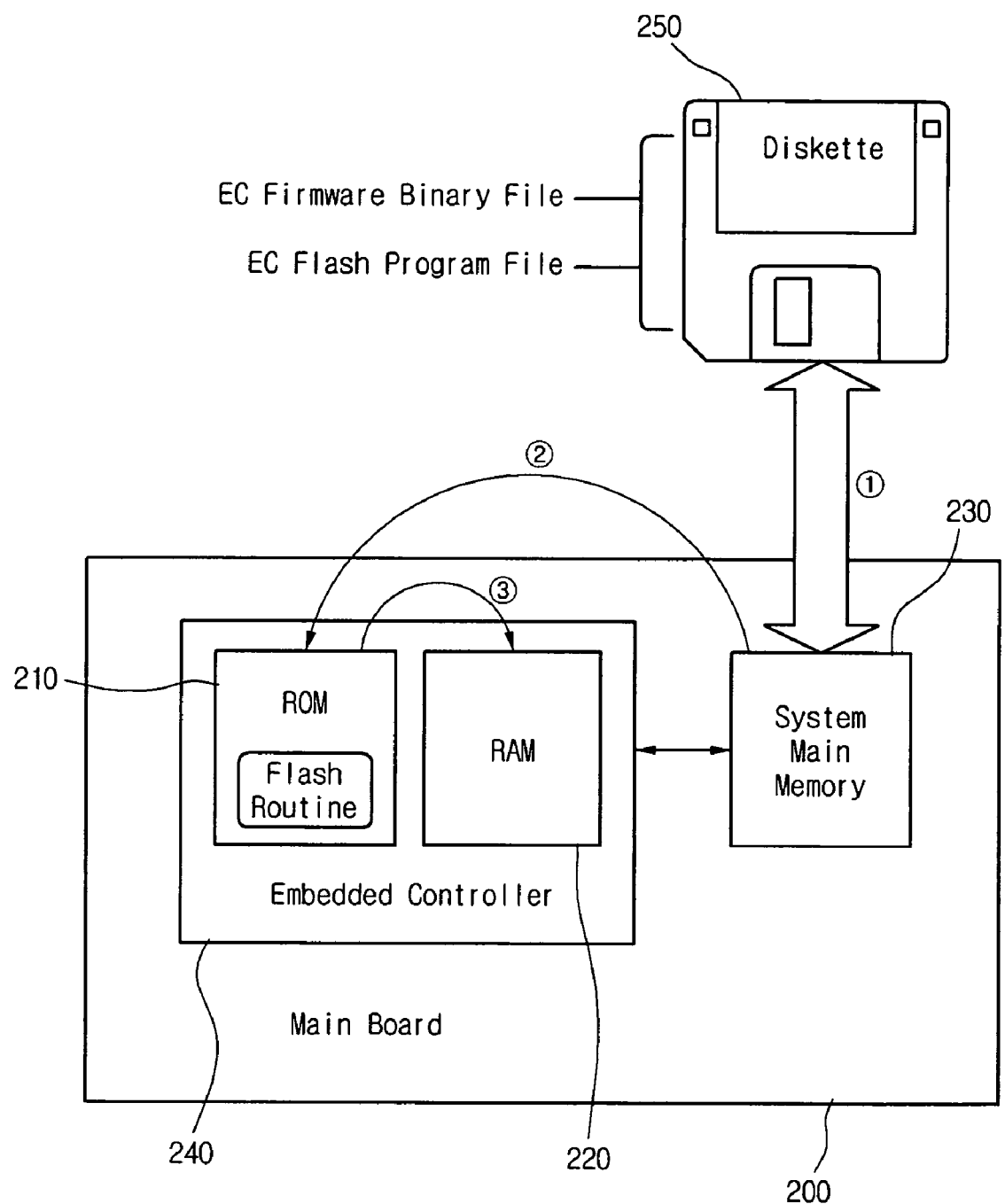
FIG. 1 is a diagram that shows part of a structure of a related art computer.

FIG. 1 shows a part of a structure of a general related art computer. For example, a main board 200 of the computer includes an embedded controller 240 and a system main memory 230.

The embedded controller 240 is divided a ROM area 210 and a RAM area 220. The ROM area 210 of the embedded controller 240 stores a general-purpose flash routine required for a firmware update operation.

In a storage medium that provides new firmware, for example, in a diskette 250, a plurality of files are recorded and stored. An EC firmware binary file as a firmware file to be newly updated and an EC flash program file as a program file required for the firmware update operation are recorded and stored.

Each file stored in the diskette 250 is downloaded into the system main memory 230. Then, the EC flash program file is executed.

The EC flash program file performs an interface operation with the flash routine as executed in the ROM area 210 of the embedded controller 240. Then, after updating the EC firmware binary file as downloaded in the system main memory 230 into the ROM 210, the EC flash program file performs a system power OFF and re-booting operation so that the firmware as updated in the ROM 210 area is copied and recorded in the RAM area 220.

Figure 2:
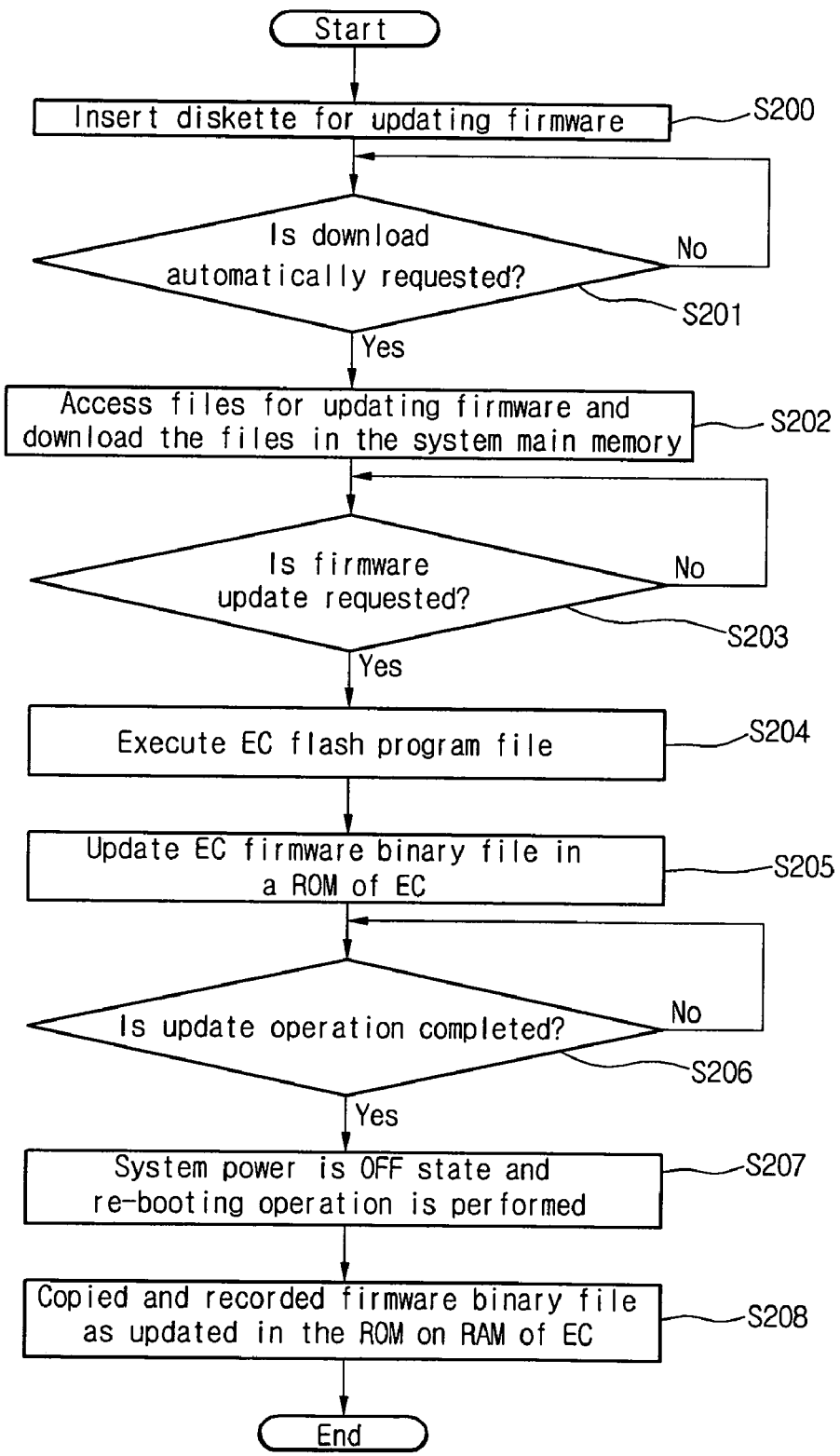
FIG. 2 is a flow chart illustrating a related art method for updating firmware in an embedded controller (EC)

FIG. 2 is a flow chart illustrating the operation of a method for updating firmware in the general related art embedded controller 240 of the portable computer of FIG. 1.

For example, in a system BIOS of a portable computer (not shown), a diskette 250 for updating firmware is inserted (block S200) and download is automatically requested according to a user's selection (block S201). In this case, the files as stored in the diskette 250 for updating firmware in the portable computer are accessed and read-out and a series of download operations for storing the files in the system main memory 230 are performed (block S202).

In the portable computer system BIOS, if a firmware update is requested by the user (block S203), the EC flash program file stored in the system main memory 230 is executed. (block S204) The program as executed by the EC flash program file performs an interface operation with the flash routine as executed in the ROM area 210 of the embedded controller 240 to update the EC firmware binary file (e.g., downloaded) on the ROM 210 from the system main memory 230 (block S205).

If the update operation is completed (block S206), a system power is driven to an OFF state and a re-booting operation is performed by the flash routine (block S207). Initiated by the re-booting operation, the firmware as updated in the ROM area 210 is copied and recorded in the RAM area 220 after being read-out by the flash routine (block S208). Thus, the re-booting operation generally forces complete shut-down of the system.

Figure 3:
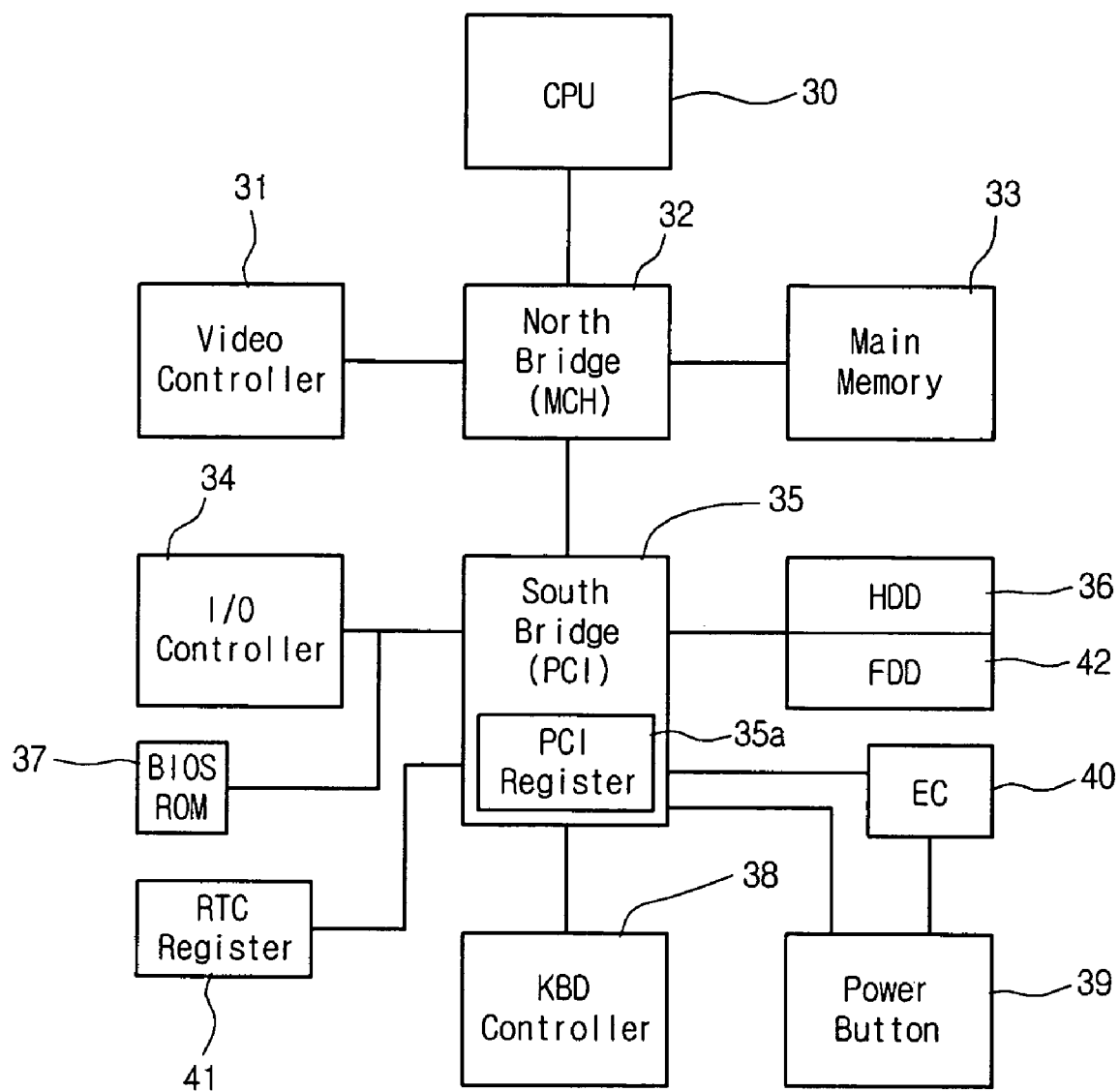
FIG. 3 is a block diagram illustrating a structure of a computer among machinery wherein a EC firmware update can be performed according to a preferred embodiment of the present invention.

FIG. 3 is a block diagram illustrating a structure of an embodiment of a portable computer among the machinery in which an EC firmware update can be performed according to embodiments of the present invention. As shown in FIG. 3, a computer can include a CPU 30 for controlling a system; a first chip set (e.g., north bridge) 32 for being in charge of a system memory bus input/output control function by being coupled with the CPU 30 and for communicating with video controller 31 and a man memory 33; and a second chip set (e.g., south bridge) 35 including a PCI register 35a for managing a peripheral device input/output, an input/output (I/O) controller 34, a hard disk drive (HDD) 36, a floppy disk drive (FDD) 42, and keyboard (KBD) controller 38, a power button 39 as well as a power management function.

The computer can further include a nonvolatile RTC memory 41 for storing tag information to maintain the system in an power-on state; an embedded controller (EC) 40; and a BIOS ROM 37. The BIOS ROM 37 is preferably a third memory including a program for recognizing and setting hardware devices in the system, proceeding to boot the system, and searching and operating an OS after the system is booted, controlling ROM and RAM for storing system-on maintaining information and the like. In the embodiment described above, if the tag for system-on is set (e.g., SYS ON Tag='1') when updating the embedded controller 40, the update program can be stored in the RAM in the state that the system is ON.

Figures 4A, 4B:
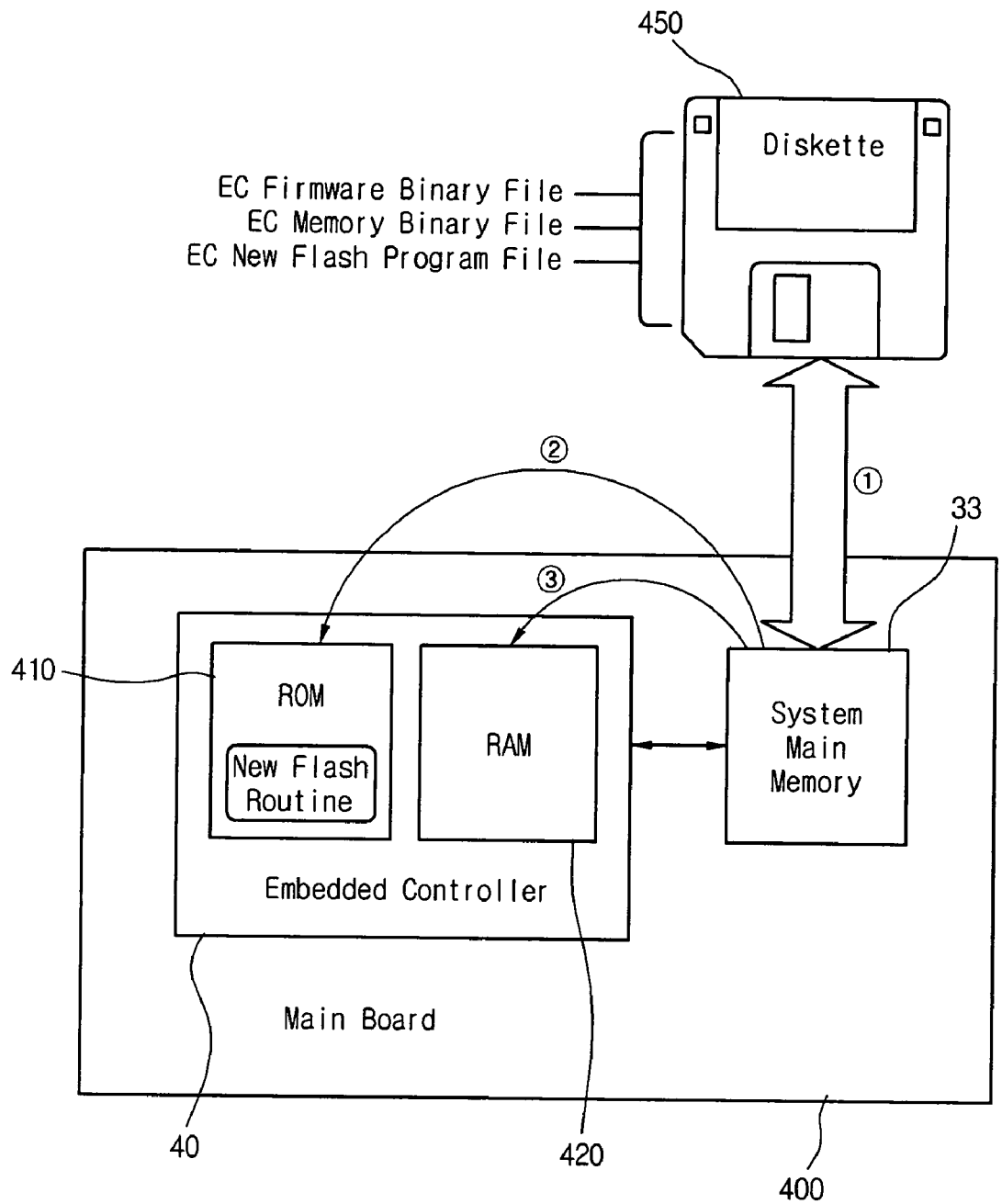

FIG. 4a is a diagram that shows part of a structure of an embodiment of a computer as shown in FIG. 3. As shown in FIG. 4a, the computer can include a main board 400 with an embedded controller 40 and a system main memory 33.

The embedded controller 40 can be dividedly assigned by a ROM area 410 and a RAM area 420. The ROM area 410 can store a new general flash routine corresponding to a new firmware update operation according to an embodiment of the present invention. A storage medium can provide the new firmware, for example, a diskette 450 can record and store an EC firmware binary file as a firmware file to be newly updated, an EC new flash program file as a new program file required for performing the firmware update operation according to embodiments of the present invention, and an EC memory binary file.

The EC memory binary file can be an auxiliary sub program file manufactured considering the proper features by makers of the embedded controller 40. The EC memory binary file is preferably executed with the EC new flash program file.

Each file (e.g., a plurality of EC firmware binary files) in the diskette 450 can be downloaded in the system main memory 33 and executed together with the EC new flash program file and the EC memory binary file. The EC new flash program file can perform an interface operation with a new flash routine to be executed in the ROM area 410 of the embedded controller and updates the EC firmware binary file as downloaded in the system main memory 33 into the ROM 410.

At this time, identification information can be set through the interface operation. Alternatively, the identification information can be previously set (e.g., by a user, system default or the like). If the identification information as set through the interface operation, for example, system-on tag (SYS ON Tag) is set as enabled '1', the EC firmware binary file as downloaded in the system main memory can be recorded and stored in the RAM 420 in the state that the system power-on is maintained.

FIG. 4b is a diagram of an exemplary data format as stored in a system main memory 33 based on external storage medium 450 of FIG. 4a. As shown in FIG. 4b, the data format can be stored in the system main memory 33 from the external storage medium 450.

As shown in FIG. 4b, the data format can include tag, RAM size and data. The tag, and RAM size can be used in the EC new flash program file. Such a use will now be described.

Figure 5A:
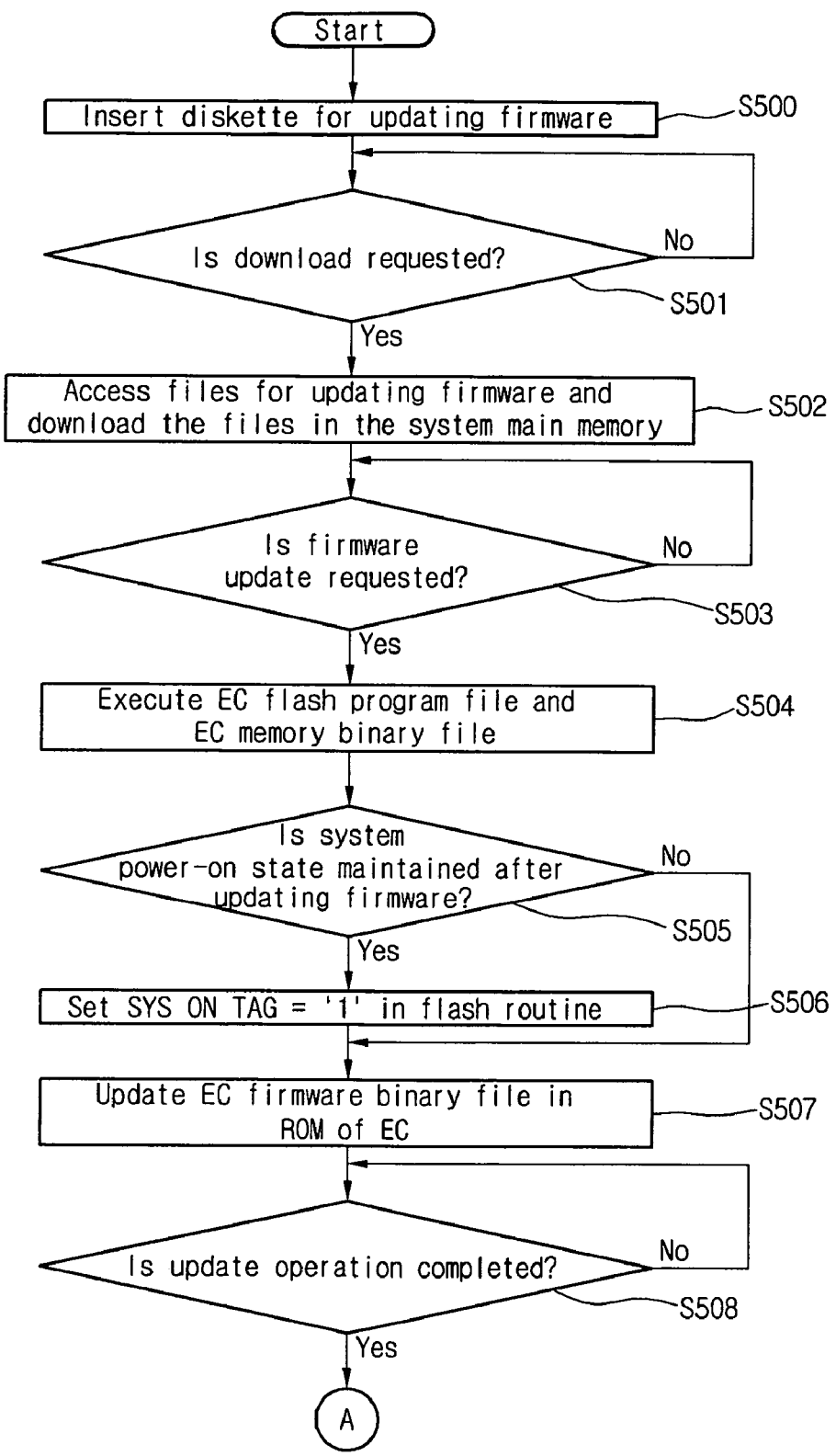
FIGS. 5a and 5b are flow charts illustrating a preferred embodiment of a method for updating firmware in an embedded controller according to the present invention.
Figure 5B:
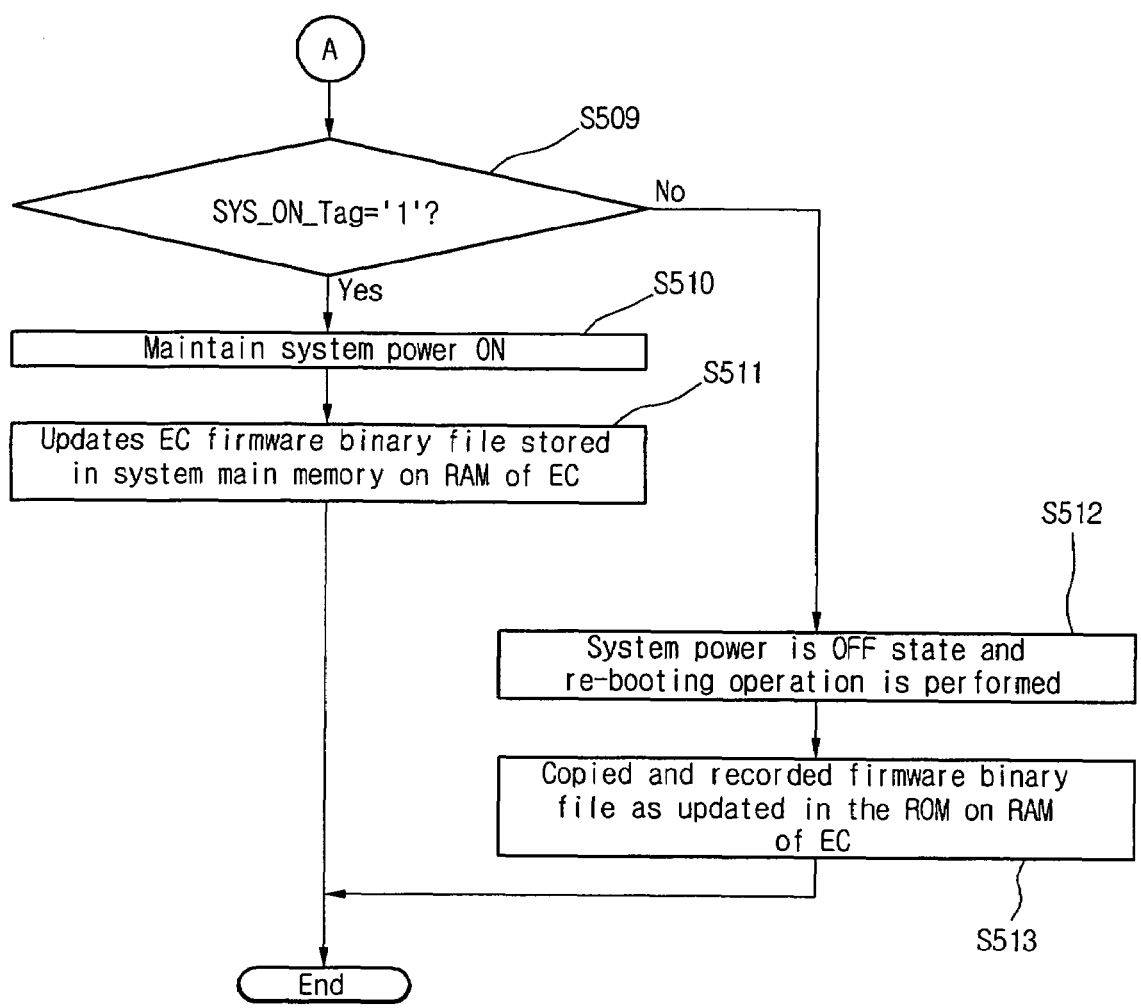

FIGS. 5a and 5b are flow charts illustrating operations of an embodiment of a method for updating firmware in an embedded controller according to the present invention. The embodiment of a method for updating firmware shown in FIGS. 5a and 5b can be applied to and will be described using the embodiment of a computer shown in FIGS. 3-4b. However, the present invention is not intended to be so limited.

For example, in a system BIOS (e.g., BIOS ROM 37 in FIG. 3) of a portable or personal computer, if a storage medium (e.g., diskette 450) for updating firmware is inserted (block S500), a download can be requested automatically, by a user's selection or the like (block S501). If a download is requested, a series of download operations for storing the files as stored in the diskette 450 for updating the firmware in the system main memory 33 can be performed by accessing and reading out the files (block S502).

If the firmware update is requested by the user (block S503), the system BIOS can execute the EC new flash program file and the EC memory binary file as the new program files as stored in the system main memory 33 (block S504).

A new program as executed by the EC new flash program file can perform an interface operation with a new flash routine as executed in the ROM area 410 of the embedded controller 40, and at this time, the new program can preferably generate a command to designate that the system power-on state is maintained after updating the firmware and transmits the command to the new flash routine. If the command to designate the system power-on maintaining is received in the new flash routine (block S505), the new flash routine can set a corresponding tag, for example, a system on tag (SYS ON TAG), to a prescribed value such as '1' (block S506).

The EC firmware binary file as downloaded in the system main memory 33 is read out and updated in the ROM area 410 (block S507). When the update operation is completed (block S508), the new flash routine can verify the system on tag value as set before performing the update operation in the RAM.

For example, as the embedded controller is reset after the update program is updated in the ROM, whether the system-on or power-on is maintained can be verified. If the system on tag (SYS ON Tag) as verified above is set as '1' or the prescribed value (block S509), the flash routine can maintain the system power-on state as it is (block S510). Further, the program as executed by the EC new flash program file that can control (e.g., maintain) the power-on state, can read out the EC firmware binary file and/or the EC memory binary file as downloaded in the system main memory 33 and update the EC firmware binary file and/or the EC memory binary file in the RAM area 420 (block S511).

According to the embodiment of the method for updating firmware in FIGS. 5a-5b, if the firmware of the embedded controller is updated as new firmware, the update operation is promptly completed by omitting the system re-booting operation. In addition an error that can occur in the copying and recording process in the RAM area can be prevented in advance by not re-reading out the firmware as recorded in the ROM area for storing in the RAM area.

If the above-verified system on tag (SYS ON Tag) is set as '0' (block S509), a system power-off and re-booting operation can be performed (block S512). Thus, the updated firmware in the ROM area 410 can be read out by the new flash routine, then, a related art operation of updating firmware to be copied and recorded in the RAM area 420 can be performed (block S513).

Embodiments of an apparatus and method for updating firmware according to the present invention can use various storage medium as well as an ordinary diskette. For example, the storage medium such as an optical disk or a memory card can be used, and contents providing server to provide files through Internet on line can be used.

Figure 6:
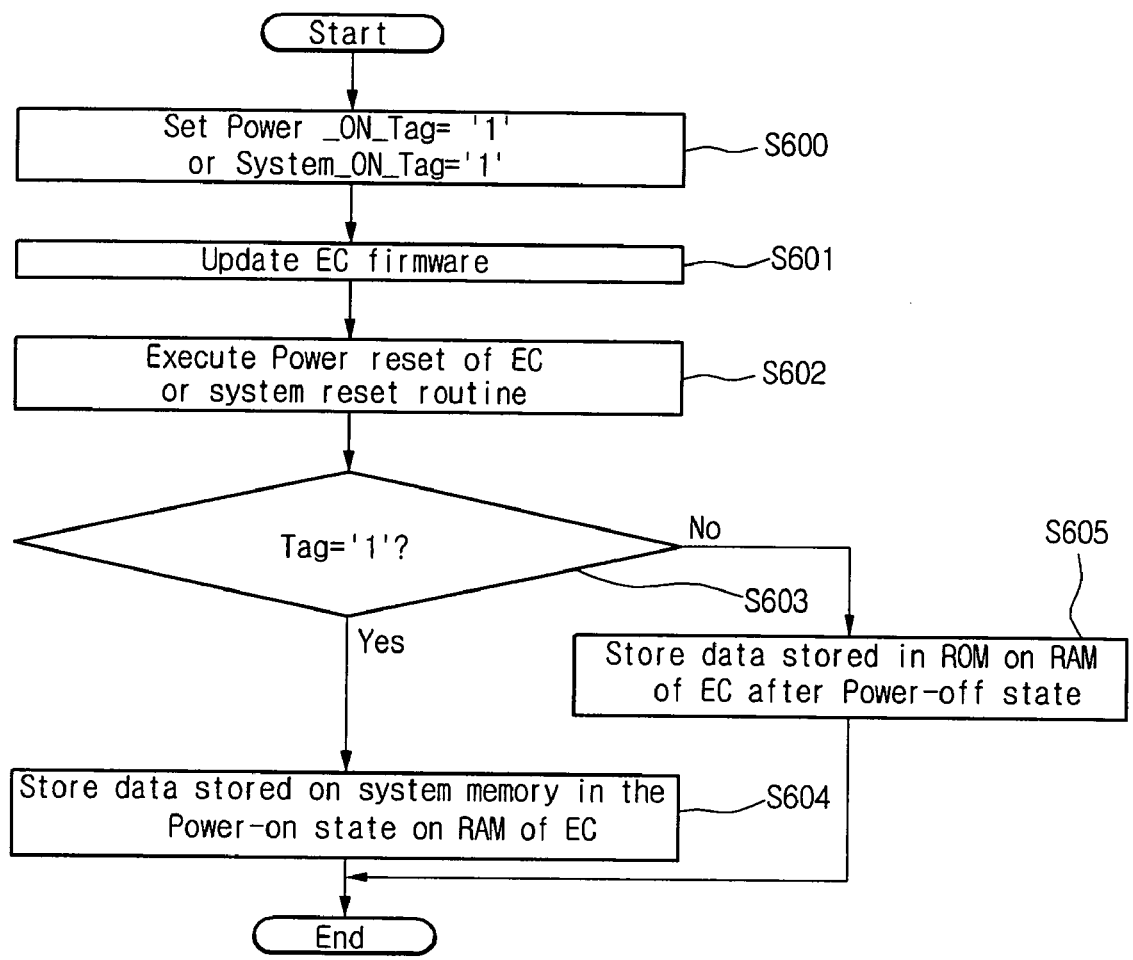
FIG. 6 is a flow chart illustrating another preferred embodiment of a method for updating firmware according to the present invention.

FIG. 6 is a flow chart illustrating another method for updating firmware according to the present invention. As shown in FIG. 6, the method can be applied to embodiments of a computer shown in FIGS. 3-4a. However, the present invention is not intended to be so limited.

According to an interface operation between a new program as preset by a user or as executed by an EC new flash program file and a new flash routine as executed in a ROM area (e.g., ROM area 410) of an embedded controller, a command for designating that a system power-on state is preferably maintained after updating the firmware (e.g., Power_ON_Tag='1' or System_ON_Tag='1') and can be generated and transmitted to the new flash routine (block S600).

An EC firmware update operation can then be performed (block S601). After that, the embedded controller can perform a power reset or system reset routine (block S602) and can verify whether the command is set (e.g., tag as set is '1'). (block S603)

As a result of verification (block S603), if the tag is '1', the data as stored in the system memory is stored in the EC RAM in the system power-on state (block S604). However, if the tag is not '1' as a result of verification (block S603), the data as stored in the ROM is stored in the EC RAM in the system power-off state (e.g., system re-boot) (block S605).

FIG. 7a is a diagram that illustrates an exemplary routine for setting a tag to maintain a system in an ON-state after updating firmware. Thus, the routine shown in FIG. 7a can be performed, for example, as in a process completing block S506. FIG. 7b is a diagram that illustrates an exemplary routine for storing maintaining a system in an ON-state and storing an update program in an embedded controller (EC) RAM. Thus, the routine shown in FIG. 7b can be performed, for example, in a process completing blocks S603-S604. In addition, the exemplary routines shown FIGS. 7a and 7b can be included in the EC new flash program file.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of an apparatus and a method for updating firmware RAM or EC RAM have various advantages. Embodiments of an apparatus and a method for updating an EC RAM can update an EC RAM in a power-on state if an EC ROM as one microcomputer is updated and predetermined information (e.g., tag information, system on tag='1') for maintaining a system in an ON-state is read out when resetting the system. In addition, not only a new firmware file can be updated and recorded but also a new firmware file can be updated and recorded in the RAM area of the embedded controller in the state of maintaining the system power-on by searching and verifying the identification information. Further, when updating the firmware of the embedded controller as new firmware, the firmware update operation can be more promptly completed by omitting the system re-booting operation. According to such embodiments, an error as occurred in the copying and recording process in the RAM area by re-reading out the firmware as recorded in the ROM area can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for updating firmware of an embedded controller of a system, comprising:
   setting a firmware update mode selected from a first mode or a second mode, the firmware update mode set based on a tag value; and
   updating a new firmware file in the embedded controller in one of the first mode or the second mode responsive to the firmware update mode set by the tag value,
   wherein the new firmware file is updated using a procedure that performs the update without a subsequent system re-boot in the first mode when the tag value is a first value and the new firmware file is updated using a procedure that performs a system re-boot in the second mode when the tag value is a second value, the firmware file updated without the subsequent system re-boot in the first mode independent of an operational status of firmware control blocks stored in a read-only memory (ROM) for the embedded controller.

2. The method of claim 1, wherein said updating the new firmware file in the embedded controller in the first mode comprises:
   updating and recording the new firmware file in the ROM area of the embedded controller; and
   updating and recording the new firmware file in a RAM area of the embedded controller without the system re-boot.

3. The method of claim 2, wherein said updating the new firmware file in the embedded controller in the second mode comprises:
   updating and recording the new firmware file in the ROM area of the embedded controller; and
   updating and recording the new firmware file in the RAM area of the embedded controller using the new firmware file in the ROM area of the embedded controller after the system re-boot.

4. The method of claim 1, wherein said updating the new firmware file in the embedded controller in the second mode comprises:
   updating and recording the new firmware file in the ROM area of the embedded controller; and
   updating and recording the new firmware file in a RAM area of the embedded controller using the new firmware file in the ROM area of the embedded controller after the system re-boot.

5. The method of claim 1, comprising:
   receiving a command directing the new firmware file to be updated while the system is maintained in a power-on state in the first mode.

6. The method of claim 5, wherein said updating further includes in the first mode:
   transferring the new firmware file from a first memory into a second memory to update firmware of the embedded controller; and
   after the firmware of the embedded controller has been updated, transferring the new firmware file from the first memory into a third memory while the system is maintained in the power-on state based on the received command.

7. A method for updating firmware of an embedded controller of a system, comprising:
   setting identification information for indicating whether or not a system power-on state is to be maintained for updating the firmware of the embedded controller;
   updating and recording a new firmware file in a ROM area of the embedded controller; and
   verifying the identification information and updating and recording the new firmware file in a RAM area of the embedded controller in accordance with a result of the verification, wherein the new firmware file is updated and recorded while the system is maintained in the power-on state if the identification information has a first value and is updated and recorded based on a system re-boot operation if the identification information has a second value,
   wherein the identification information includes a first tag value for designating that the power-on state is maintained without a subsequent re-booting of the system when the new firmware file update is completed in the ROM area of the embedded controller, and
   wherein the identification information includes a second tag value for designating that the power-on state is turned off and the system is re-booted when the new firmware file update is completed in the ROM area of the embedded controller.

8. The method of claim 7, wherein the power-on state is maintained when the identification information has said first value to prevent the system re-boot.

9. The method of claim 8, wherein the verifying includes:
   searching for and verifying the identification information in a flash routine in a system memory when a new firmware update is completed in the ROM area of the embedded controller.

10. The method of claim 7, further comprising downloading the new firmware file or a new program file as provided from an external storage medium into a system main memory of the system.

11. The method of claim 7, wherein the setting identification information selectively sets the identification information for maintaining the system power-on state by an interface operation between a flash routine as stored in the ROM area of the embedded controller and an update program file of the firmware as stored in a system main memory.

12. The method of claim 7, wherein the updating and recording step updates and records the new firmware file in the RAM area of the embedded controller by reading our from a system main memory.

13. An apparatus for updating firmware, comprising:
   an embedded controller configured to have a firmware file to be updated, a main program memory and an auxiliary program memory, wherein the main and auxiliary program memories perform an operation of updating the firmware to be recorded and stored in the embedded controller; and a controller configured to generate a command to maintain a system power-on state during the operation for updating the firmware of the embedded controller in the main and auxiliary program memories, the command generated based on a set tag value, wherein the firmware file is updated while maintaining the system power-on state without a subsequent reboot when the rag value is a first value and wherein the controller generates a command to update the firmware of the embedded controller with a system re-boot when the tag value is a second value, the firmware updated while maintaining the power-on state independent of an operational status of firmware control blocks stored in a read-only memory for the embedded controller.

14. The apparatus of claim 13, wherein the controller executes a flash program file and a program file manufactured considering the proper features by manufacturers of the embedded controller to update the firmware file in the main program memory and the auxiliary program memory.

15. A computer readable storage medium having computer-executable components, comprising:

a first component for setting a firmware update mode for updating firmware of an embedded controller of a portable computer based on a tag value; and a second component for updating a new firmware file in the embedded controller in one of a first mode or a second mode responsive to the set firmware update mode, wherein the new firmware file is updated without a system re-boot in the first mode and the new firmware file is updated with a system re-boot in the second mode, wherein the new firmware file is updated using a procedure that performs the update without a subsequent system re-boor in the first mode when the tag value is a first value and the new firmware file is updated with the system re-boot in the second mode when the tag value is a second value, the new firmware file updated without the system re-boot in the first mode independent of an operational status of firmware control blocks stored in a read-only memory (ROM) for the embedded controller.

16. The computer readable storage medium of claim 15, wherein said first component comprises:

a first sub-component for updating and recording the new firmware file in the ROM area of the embedded controller; and a second sub-component for updating and recording the new firmware file in a RAM area of the embedded controller without the system re-boot.

17. The computer readable storage medium of claim 16, wherein said second component comprises:

a first sub-component for updating and recording the new firmware file in the ROM area of the embedded controller; and a second sub-component for updating and recording the new firmware file in the RAM area of the embedded controller using the new firmware file in the ROM area of the embedded controller after the system re-boot.

* * * * *